Feb. 27, 1968   A. L. STOECKEL ET AL   3,370,620
METHOD AND APPARATUS FOR MAKING STUDDED STRANDS
Filed Aug. 13, 1965                                    9 Sheets-Sheet 1
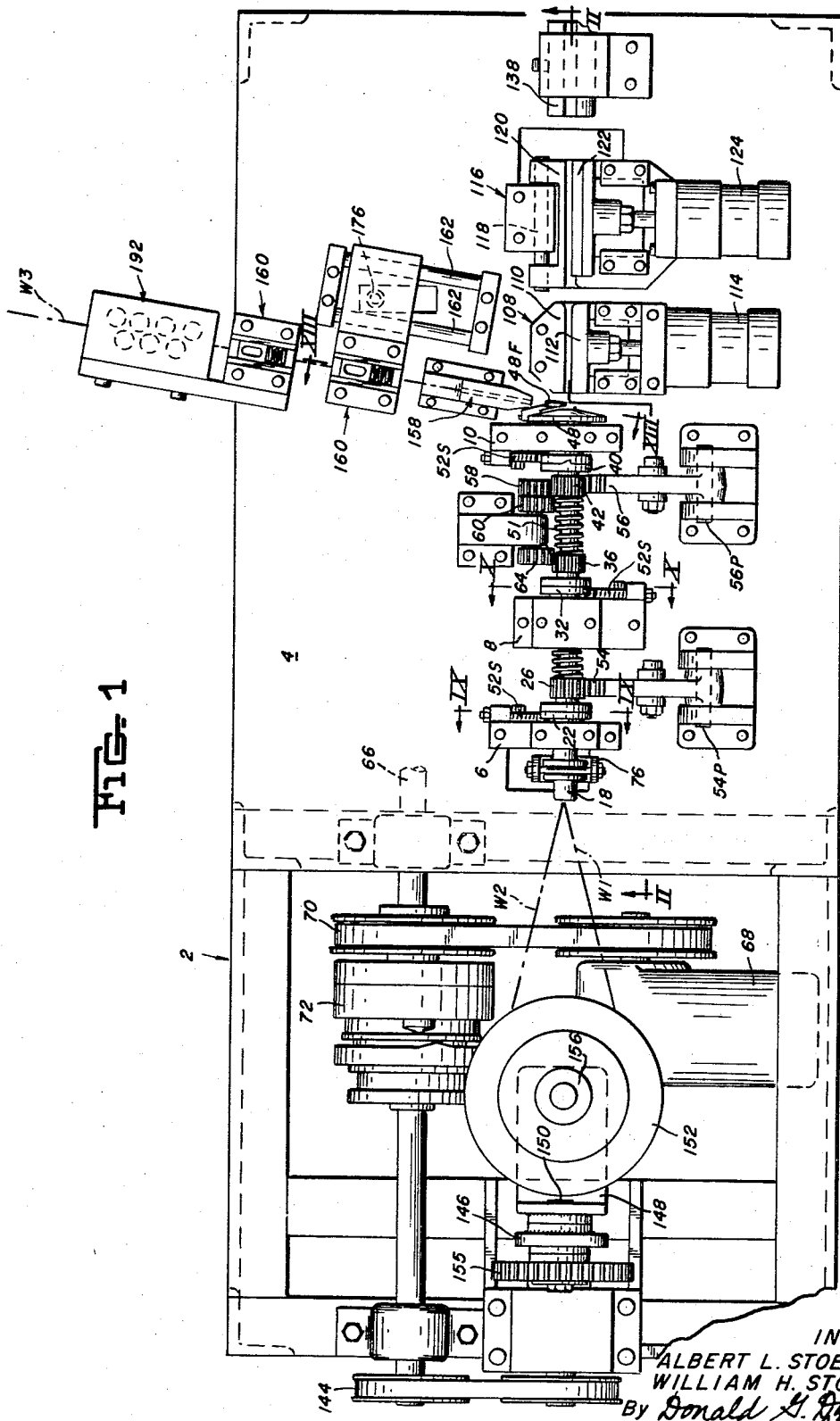
INVENTORS
ALBERT L. STOECKEL and
WILLIAM H. STOKES
By Donald G. Dalton
Attorney

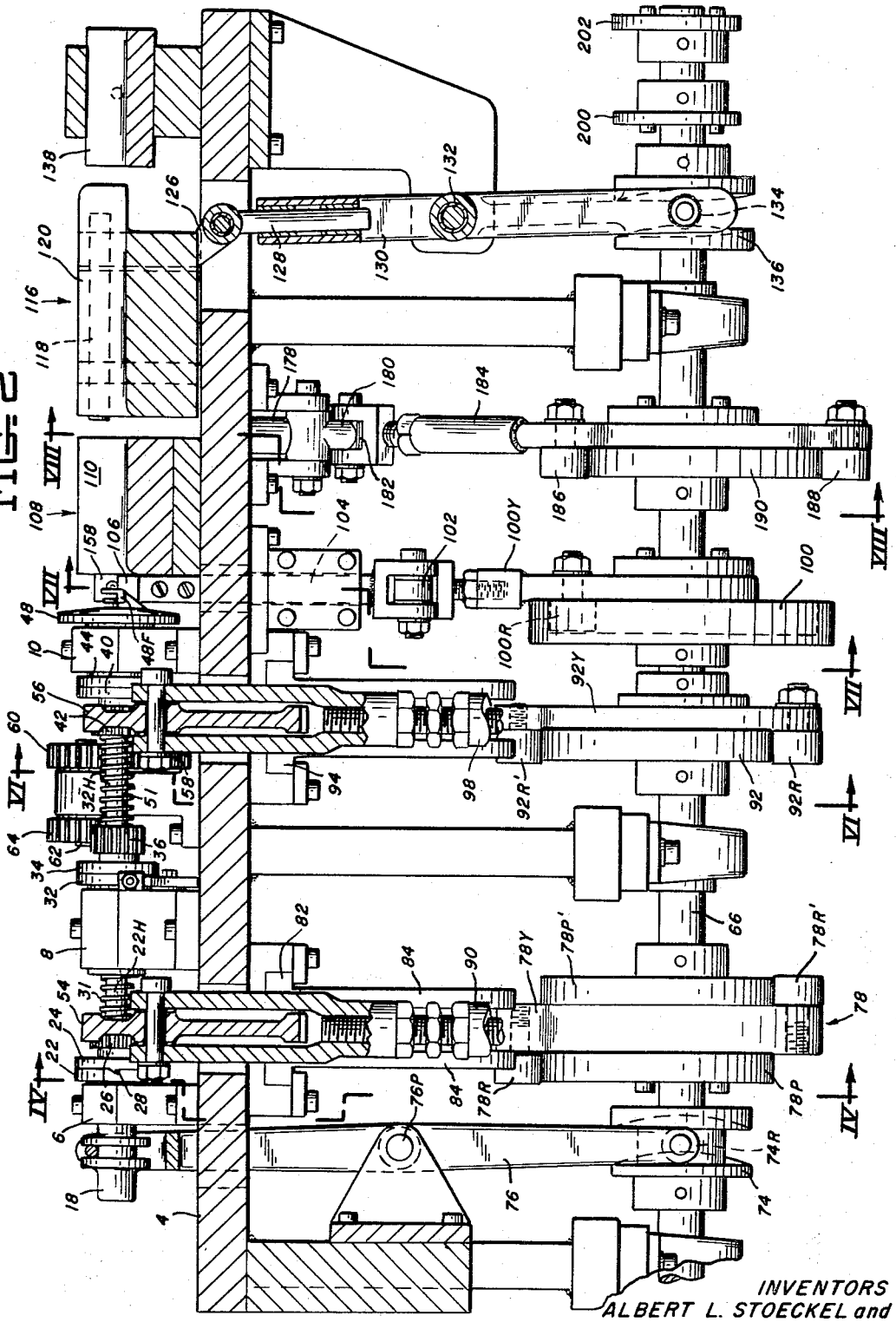

Feb. 27, 1968   A. L. STOECKEL ET AL   3,370,620
METHOD AND APPARATUS FOR MAKING STUDDED STRANDS
Filed Aug. 13, 1965   9 Sheets-Sheet 3
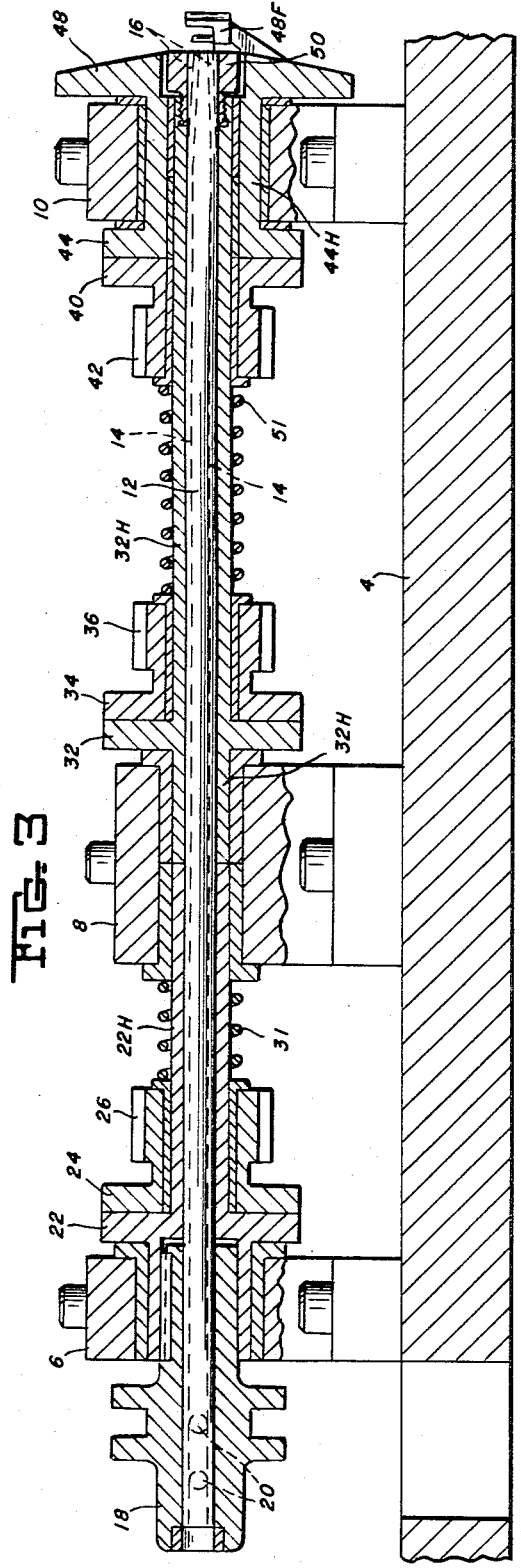
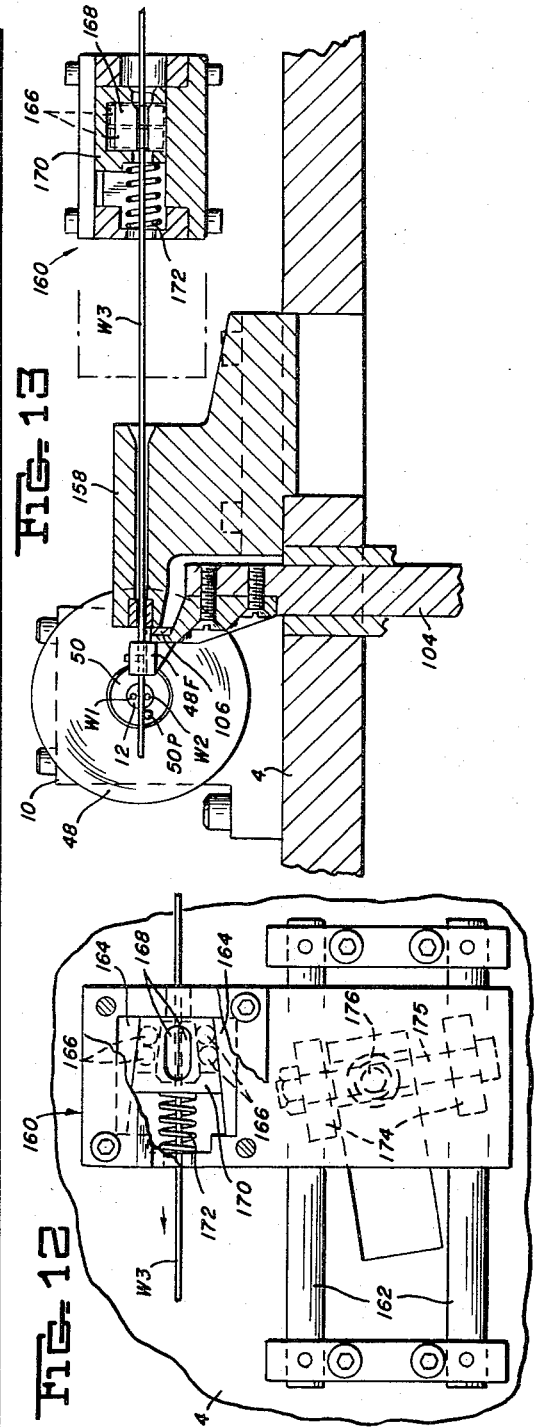
INVENTORS
ALBERT L. STOECKEL and
WILLIAM H. STOKES
By Donald G. Dalton
Attorney

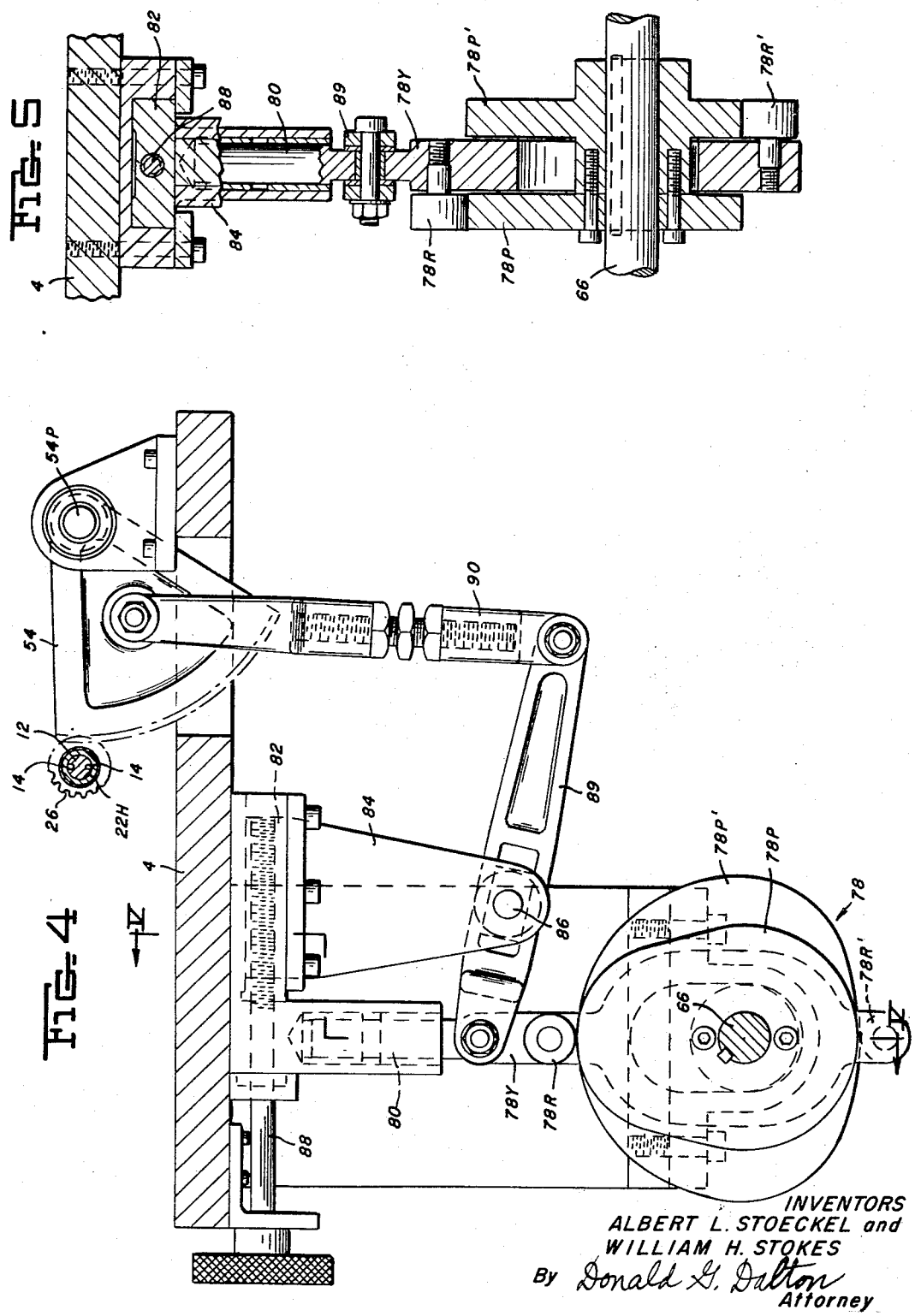

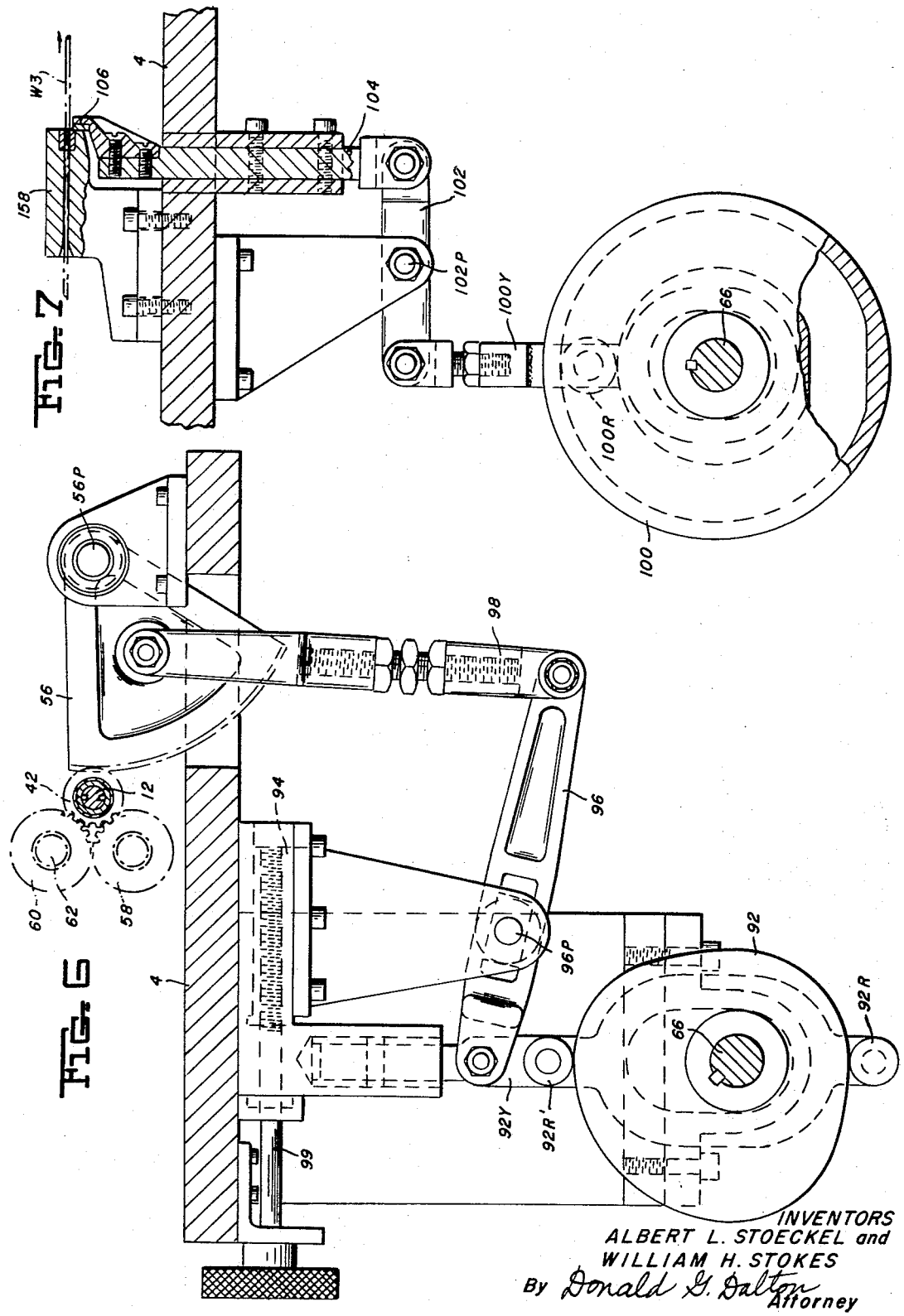

Feb. 27, 1968 A. L. STOECKEL ET AL 3,370,620
METHOD AND APPARATUS FOR MAKING STUDDED STRANDS
Filed Aug. 13, 1965
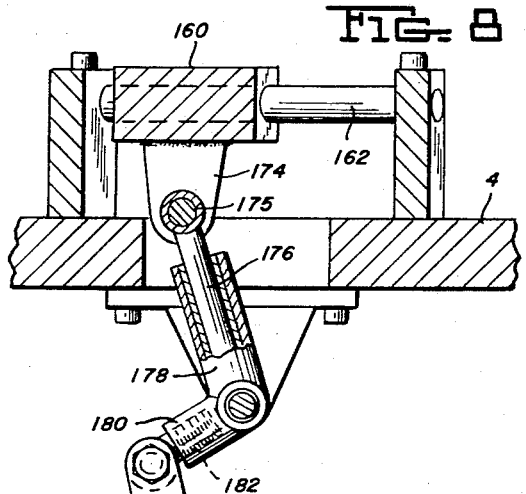
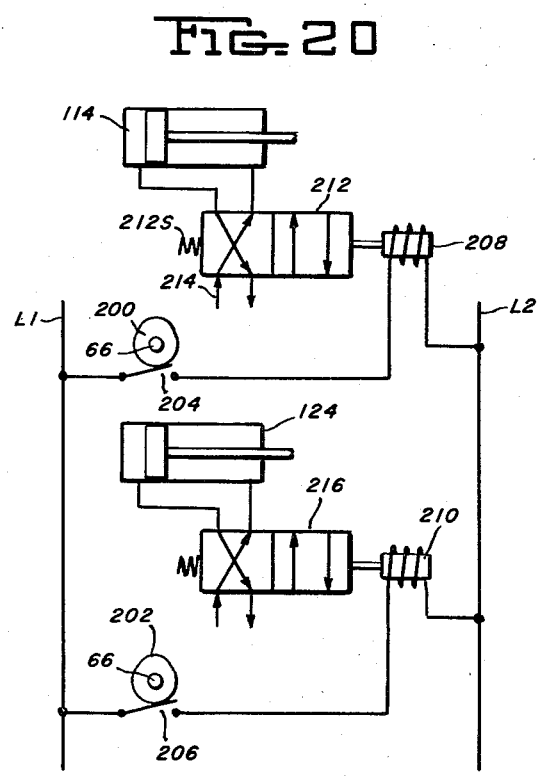
INVENTORS
ALBERT L. STOECKEL and
WILLIAM H. STOKES
By Donald G. Dalton
Attorney

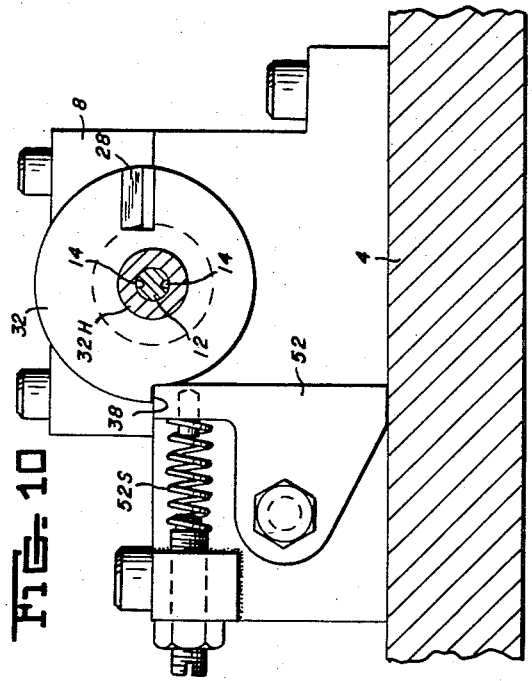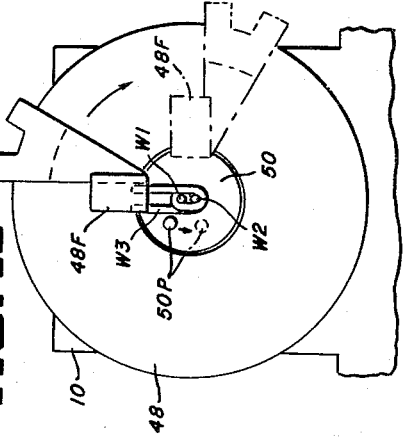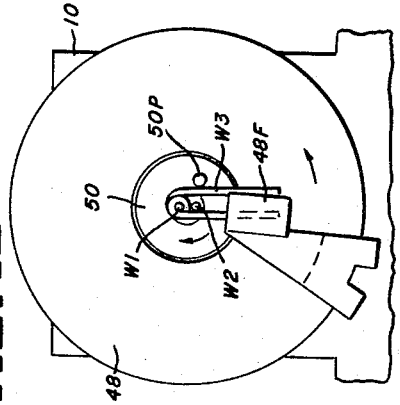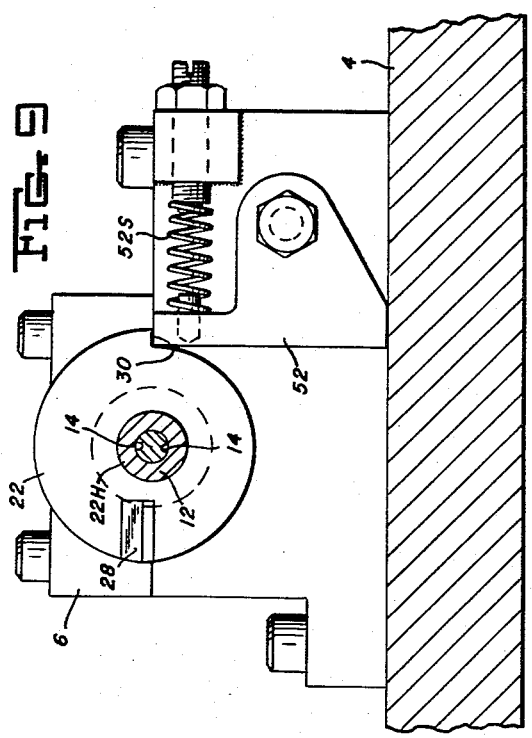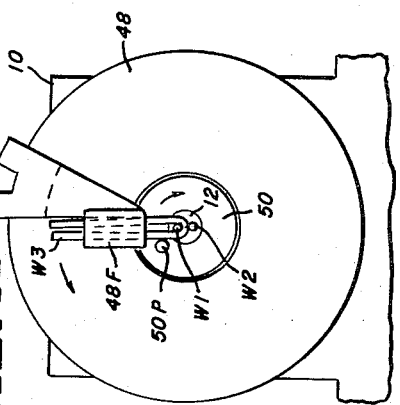

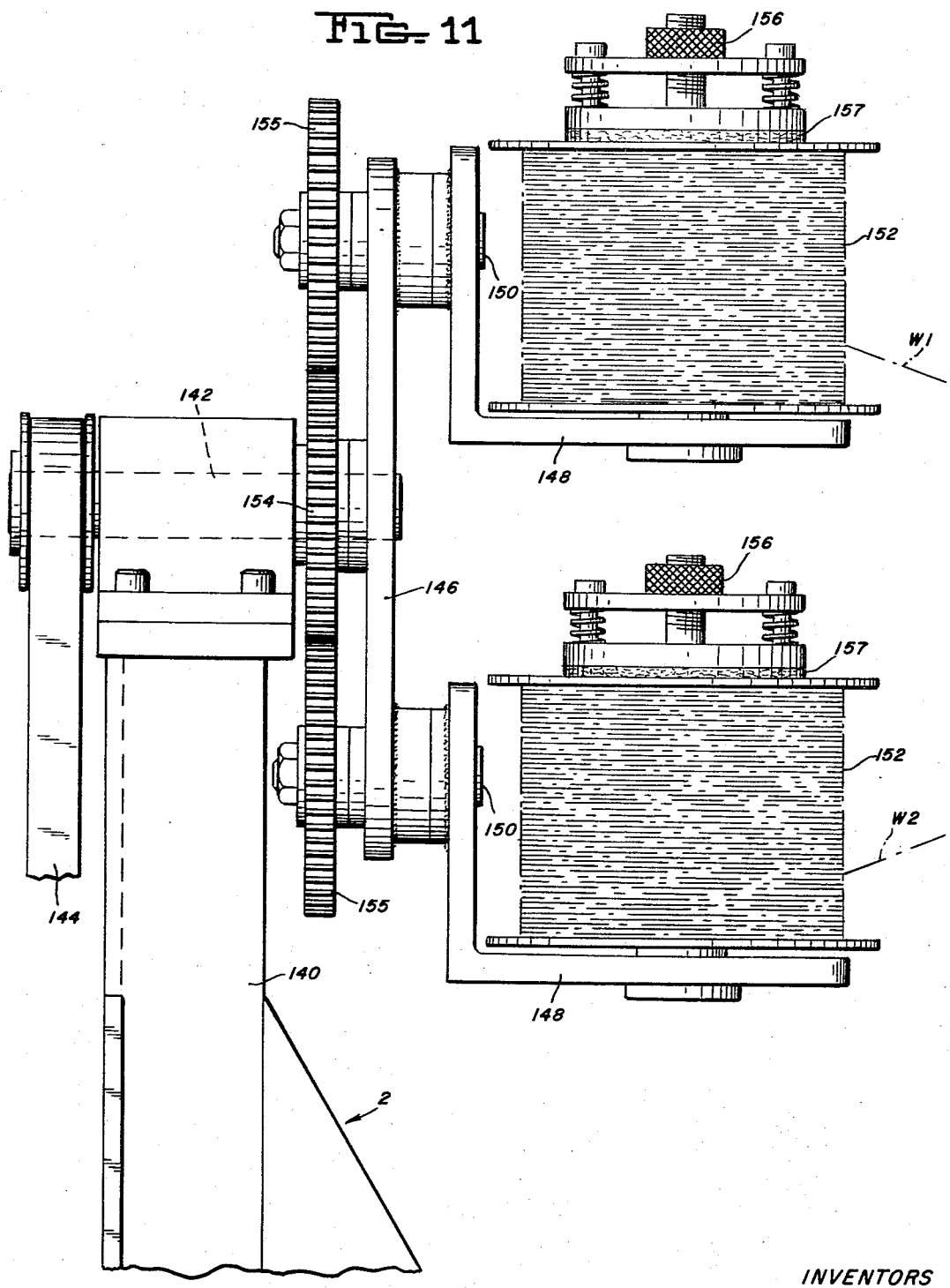

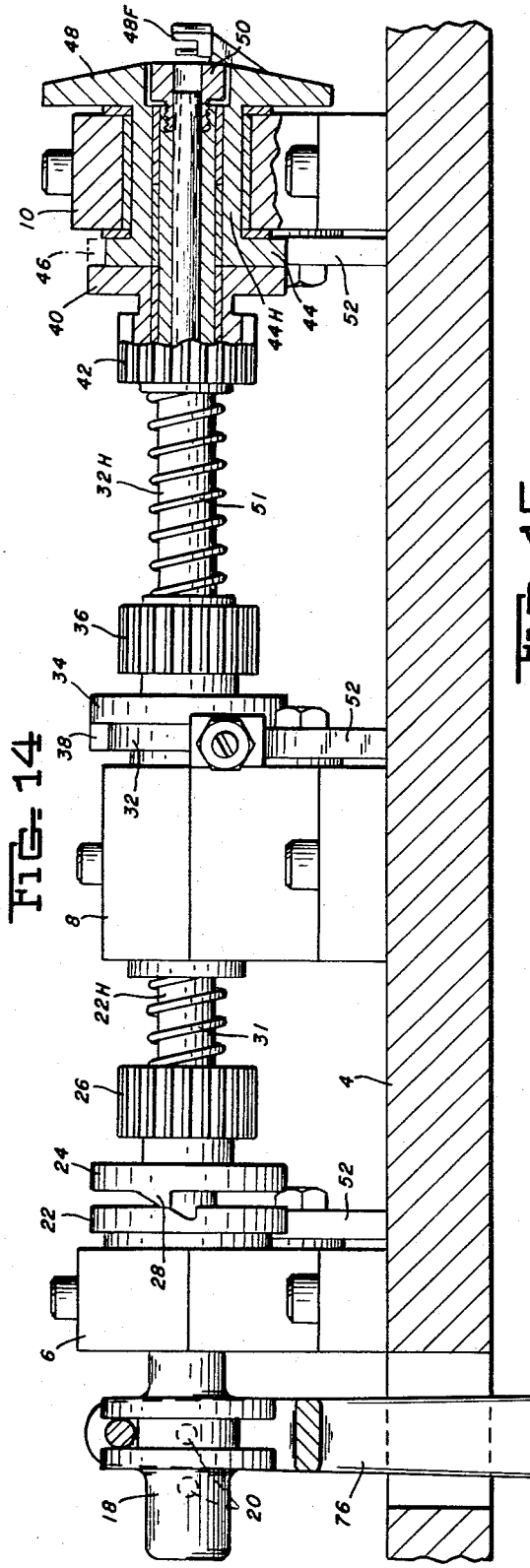
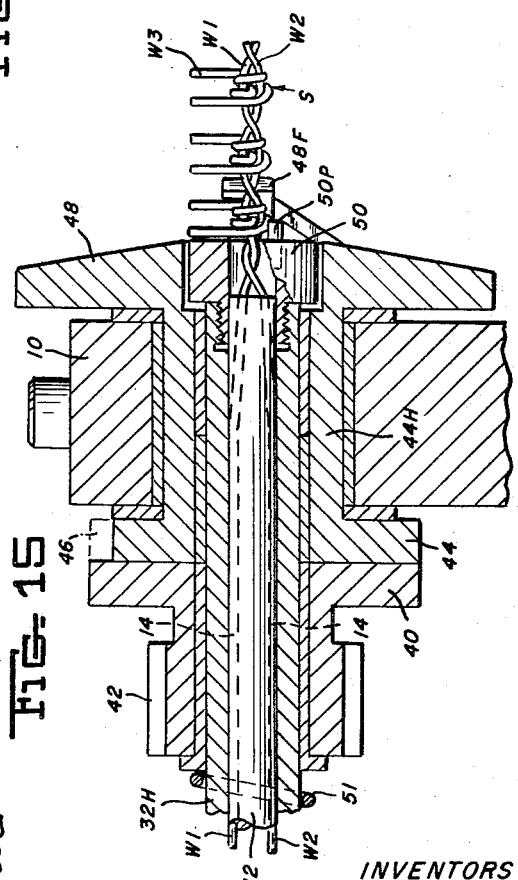

United States Patent Office 3,370,620
Patented Feb. 27, 1968

3,370,620
METHOD AND APPARATUS FOR MAKING STUDDED STRANDS
Albert L. Stoeckel, Euclid, and William H. Stokes, Lakewood, Ohio, assignors to United States Steel Corporation, a corporation of Delaware
Filed Aug. 13, 1965, Ser. No. 479,506
10 Claims. (Cl. 140—67)

ABSTRACT OF THE DISCLOSURE

Method and apparatus for making studded strands in which two line wires are twisted together to form eyes spaced at intervals at points of assembly, stud wires are fed through the eyes at the points of assembly, and the stud wires are wrapped around the line wires with their ends extending in the same direction.

---

This invention relates to a method and apparatus for making studded strands and more particularly for making a strand such as shown in Stokes Patent No. 3,167,280 dated Jan. 26, 1965. In making this strand it is necessary that two or more line wires be stranded together and stud wires be wrapped around them at spaced intervals. These strands are normally used in tires and the studs must be precisely positioned and formed. Prior to our invention we did not know of any way of making this type of strand inexpensively and accurately.

It is therefore an object of our invention to provide a method of rapidly, inexpensively and accurately making such a strand.

Another object is to provide relatively simple apparatus for making such a strand inexpensively and accurately.

These and other objects will be more apparent after referring to the following specification and attached drawings, in which:

FIGURE 1 is a top plan view of the machine of our invention;

FIGURE 2 is a sectional view, on an enlarged scale, taken on the line II—II of FIGURE 1;

FIGURE 3 is an enlarged vertical section of a portion of the machine;

FIGURE 4 is a view taken on the line IV—IV of FIGURE 2;

FIGURE 5 is a view taken on the line V—V of FIGURE 4;

FIGURE 6 is a view taken on the line VI—VI of FIGURE 2;

FIGURE 7 is a view taken on the line VII—VII of FIGURE 2;

FIGURE 8 is a view taken on the line VIII—VIII of FIGURE 2;

FIGURE 9 is a view, on anlarged scale, taken on the line IX—IX of FIGURE 1;

FIGURE 10 is a view, on an enlarged scale, taken on the line X—X of FIGURE 1;

FIGURE 11 is a side elevation of the entry end of the machine;

FIGURE 12 is a plan view of the stud wire feeding mechanism with parts broken away;

FIGURE 13 is a view taken on the line XIII—XIII of FIGURE 1;

FIGURE 14 is a longitudinal elevation, partly in section, showing the position of the machine just prior to the return to the normal position;

FIGURE 15 is a sectional view showing a partially formed strand leaving the forming mechanism;

FIGURE 16 is an end view of FIGURE 15 showing a wire stud in position prior to twisting it around the line wires;

FIGURE 17 is a view, similar to FIGURE 16, but showing the stud wire wrapped around the upper line wire;

FIGURE 18 is a view, similar to FIGURE 17, showing a further step in the formation of the stud;

FIGURE 19 is a view, similar to FIGURE 18, showing the stud completely formed and attached to the line wires; and FIGURE 20 is a schematic view of the electrical circuit and pneumatic system for controlling operation of pneumatic motors used in the machine.

Referring more particularly to the drawings, reference numeral 2 indicates a machine frame having a top 4. Mounted on the top 4 are three axially aligned bearing blocks 6, 8 and 10. Extending through the bearing blocks 6, 8 and 10 is a wire guide rod 12 having diametrically opposed longitudinal grooves 14 therein which extend for almost the full length thereof. At the exit end of the rod the grooves 14 merge into holes 16 which converge toward the exit end. Mounted on the entry end of the rod 12 is a yoke 18 which is secured to rod 12 for movement therewith such as by means of set screws 20. The yoke 18 is keyed to a clutch member 22 which is mounted for rotation within the bearing block 6. Member 24, forming the other part of the clutch, includes a gear 26. The abutting faces of members 22 and 24 include a detent and projection arrangement 28. The outer periphery of member 22 is shaped to provide a ratchet stop 30. The member 22 has an elongated hub 22H which extends through member 24 into bearing block 8. A spring 31 surrounding hub 22H urges member 24 toward member 22. A second clutch includes a member 32 having a hub 32H also extending into the bearing block 8 and terminating adjacent the hub 22H. Member 34 of the second clutch includes a gear 36. The members 32 and 34 are similar to the members 22 and 24 of the first clutch with a ratchet stop 38 being provided on member 32. Hub 32H also extends through the opening of bearing block 10. A third clutch having a member 40 with a gear 42 thereon surrounds the hub 32H as does its member 44. The abutting portions of the members 40 and 44 are similar to the corresponding members of the first and second clutches with a stop 46 being provided on member 44. Member 44 includes an elongated hub 44H which extends completely through the bearing block 10 with a twisting face 48 integral therewith on the exit end of the bearing block 10. A bifurcated twisting finger 48F is secured to the twisting face 48. A nut 50 having a twisting pin 50P extending therefrom is threaded on the exit end of hub 32H within an opening in twisting face 48. A spring 51 urges the members of the second and third clutches into engagement. It will be seen that the yoke 18 and clutch member 22 will always rotate with rod 12, member 24 will rotate independently of rod 12 except when engaged with member 22, and that members 32, 34, 40 and 44 will rotate independently of the rod 12. Twisting face 48 and nut 50 will rotate with respect to one another in opposite directions at times during operation of the machine. Attached to each of the bearing blocks 6, 8 and 10 is a pivotally mounted detent latch 52 which is urged by means of spring 52S toward the associated clutch.

Gear 26 is in mesh with a sector gear 54 which is pivotally mounted on pivot pin 54P supported above the frame top 4. A similar sector gear 56 is pivotally mounted on pivot pin 56P and is in mesh gear 42 which drives an elongated gear 58 which in turn drives a gear 60 mounted on one end of a shaft 62. A gear 64 mounted on the other end of shaft 62 is in mesh with gear 36.

Mounted on the machine frame 2 below the table 4 is a main drive shaft 66 which is driven from motor 68 by means of belt 70 through an overriding clutch 72. A barrel cam 74 mounted on shaft 66 for rotation therewith receives a cam roller 74R attached to the lower end of a lever 76 which is pivotally mounted on a stationary pivot pin 76P intermediate its length. The upper end of the lever 76 is connected to the yoke 18 so that the rod 12 is moved axially by rotation of shaft 66. A cam 78 is mounted on the shaft 66 for rotation therewith. Cam 78 includes cam plates 78P and 78P′ having cooperating cam rollers 78R and 78R′. The cam rollers 78R and 78R′ are mounted on yoke bracket 78Y which is guided at its upper end by a slide 80. Suspended from the top 4 is a horizontal guide 82 for a bracket 84 which supports a pivot pin 86. A threaded rod or screw 88 is threaded into bracket 84 for moving it longitudinally and changing the position of pin 86. A lever 89 is pivotally mounted on pivot pin 86 and has one end pivotally secured to the yoke 78Y and the other end pivotally secured to the lower end of an adjustable length lever 90. The upper end of lever 90 is pivotally secured to the quadrant gear 54.

A cam 92 is secured to shaft 66 beneath gear 42 and is provided with cam rollers 92R and 92R′. The rollers 92R and 92R′ are mounted on yoke 92Y which is guided in slide 94. A lever 96 is pivotally mounted on a pin 96P intermediate its length and has one end pivotally connected to yoke 92Y and the other end pivotally connected to the lower end of an adjustable length arm 98, the upper end of which is pivotally connected to segment gear 56. The mounting of the pin 96P is similar to that of pin 86 and hence need not be described in detail. Threaded rod 99 corresponds to rod 88.

Also mounted on the shaft 66 is a cam 100. Cam roller 100R is mounted on a yoke 100Y which is pivotally connected at its upper end to a lever 102. The other end of lever 102 is pivotally connected to an arm 104 which supports a shear blade 106. The lever 102 is pivotally mounted on pin 102P.

A clamp 108 is mounted on top 4 adjacent the exit end of rod 12 and has a fixed jaw 110 and a movable jaw 112 which is actuated by pneumatic motor 114. A clamp 116 is mounted on top 4 on the exit end of clamp 108 and in alignment therewith. The clamp 116 is slidably mounted on slides 118 and includes a fixed jaw 120 and a movable jaw 122 which is reciprocated by pneumatic motor 124. The clamp 116 has a dependent arm 126 pivotally attached to a rod 128 which is slidably mounted in a lever 130 pivotally mounted on a pin 132 intermediate its length. The lower end of the lever 130 carries a cam roller 134 which cooperates with a barrel cam 136 mounted on shaft 66. A guide 138 is mounted on the top 4 at the exit end of clamp 116.

Mounted on the machine frame 2 at the entry end of guide rod 12 is a bearing stand 140 which rotatably supports a shaft 142. Belting 144 drives shaft 142 from drive shaft 66. An arm 146 is keyed to the shaft 142 and rotatably supports two brackets 148 on shafts 150. The brackets 148 rotatably support spools 152 carrying line wires W1 and W2. A gear 154 rotatably supported on shaft 142 is in mesh with two gears 155 which are keyed to shafts 150. Spool retaining nuts 156 and friction pads 157 are provided for adjustment of line wire tension. This arrangement keeps the axes of the spools vertical during operation of the machine.

Mounted on top 4 at an angle with respect to the axis of guide rod 12 is a wire guide 158 for delivering stud wire W3 to the line wires W1 and W2. A wire feeder 160 is mounted on guide rods 162. The wire feeder 160 includes two horizontally spaced apart wedges 164 having their wedge surfaces diverging away from the entry end. A pair of rollers 166 having their axes vertical are positioned to contact the wedge surfaces of each wedge 164. Two opposed wedge shaped grips 168 are positioned between the pairs of rollers 166. A cage 170 which is placed over parts 166 and 168 to retain them in alignment is urged toward the entry end of the guide by spring 172. A pair of arms 174 are attached to the bottom of wire feeder 160. A rod 175 extends between arms 174 and slidably supports one end of a pin 176 which is slidably mounted in an arm 178 which in turn is integral with an arm 180. A pin 182 pivotally connected to an adjustable arm 184 is secured to arm 180. Rollers 186 and 188 are secured to the arm 184 and bear against cam 190 which is mounted for rotation with shaft 66. A roller straightener 192 is provided at the entry end of wire feeder 160.

Cams 200 and 202 are mounted on shaft 66 for rotation therewith. Microswitches 204 and 206 are mounted adjacent the cams 200 and 202, respectively, for operation thereby. Switch 204 is mounted in series with a solenoid 208 across A.C. power lines L1–L2. Switch 206 is mounted in series with a solenoid 210 across lines L1–L2. Solenoid 208 operates a 3-way valve 212 which controls flow of air to cylinder 114. When the solenoid 208 is deenergized the spring 212S will move the valve 212 to the position shown to deliver air through conduit 214 into the front of cylinder 114 so that the formed strands will not be clamped. When the solenoid 208 is energized the valve 212 will be positioned so that air is delivered through conduit 214 into the rear of cylinder 114 to clamp the strand. In like manner valve 216 will be operated by solenoid 210 so as to clamp the strand when the solenoid is energized and to release it when deenergized.

In operation, the operator first feeds line wires W1 and W2 manually through the bar 12 to the exit end thereof and out through the end to put an eye into them. The stud wire W3 is fed manually through the straightener 192, feeder 160 and the guide 158 into the eye of the line wires W1 and W2 and the studs are attached to the line wires by manual operation of the machine. This manual operation is continued until sufficient length of the strand S reaches the clamp 116 to enable the clamp to pull the strand through the machine. The motor 68 is then started to cause the machine to go through its normal cycle of operation which is as follows: The shaft 66 continuously rotates, thus causing the cams mounted thereon to rotate. Also, the arm 146 will be rotated with the spools 152 being positioned with their axes vertical by reason of the arrangement shown. Assuming that the line wires W1 and W2 have been twisted together to form an eye at the exit end of the guide rod 12, but without a stud wire extending therethrough, the feeder 160 will be moved forwardly automatically toward the eye or point of assembly. This causes the wire W3 to be tightly gripped and then fed through the wire guide 158 and forwardly over the cutter blade 106 until wire of the desired length has been fed through the eye in the line wires W1 and W2 at which time forward movement of feeder 160 ceases. This is shown in FIGURE 13. At this time cam 100 will reach a position where it will cause the cutter blade 106 to move upwardly, cut the wire and then retract so that a stud wire of desired length is in position for forming as shown in FIGURE 16. The clamp 108 is then in operative position. Simultaneously, the quadrant gear 56 will be rotated. This causes the coiler head 48 to rotate counterclockwise and the nut 50 to rotate in a clockwise direction as viewed from the discharge end of the machine. These movements continue for 1¼ revolutions at which time there is a dwell. During this movement, as shown in FIGURES 17, 18 and 19, the finger 48F and pin 50P engage the stud wire and bend it around the upper line wire and then around both line wires with two upwardly extending parallel legs being formed. The rotation should be slightly more than 1¼ revolutions to compensate for the spring-back tendency of the stud wire. The quadrant gear 54 then causes gear 26 to rotate in a counterclockwise direction for 1¼ revolutions and simultaneously cam 74 causes wire guide yoke 18 to move backward a distance equal to the spacing of the studs. At this time the studs are restrained from movement by the finger 48F and pin 50P so that rotation of the rod 12 will twist the line wires together between the studs and further lock the stud to the line wires. During the twisting operation, clamp 108 holds the strand from turning and the wire feeder 160 and the clamp 116 return to their original positions. The clutch parts 22, 32 and 44 then move backward ¼ of a revolution at which time their respective dogs become engaged with the ratchet. This brings the finger 48F and pin 50P into position for the next cycle. During the reversal, yoke 18 returns to its original forward position. Also, during reversal, clamp 108 opens and clamp 116 closes and feeds forwardly the distance between studs. The operation is then repeated.

The total movement of the segment gears 54 and 56 may be adjusted by means of threaded rods 88 and 99. The length of links 90 and 98 are adjustable to vary the end stroke positions of the segment gears 54 and 56. In this manner the stopping position of the twister finger 48F and twister pin 50P may be controlled so as to form the stud precisely as desired.

While one embodiment of our invention has been shown and described it will be apparent that other adaptations and modifications may be made without departing from the scope of the following claims.

We claim:

1. Apparatus for making a strand of line wires with wire studs attached thereto at spaced intervals comprising means for feeding the line wires longitudinally, means for twisting the line wires together to form an eye therein at a point of assembly, means for feeding a stud wire through each eye at the point of assembly with an end extending from each side of the line wires, and means for wrapping the stud wires around the line wires with their ends extending therefrom in the same direction.

2. Apparatus according to claim 1 in which the means for feeding the line wires longitudinally includes a clamp for engaging a completed portion of the strand, means operable to move the clamp longitudinally forward a distance equal to stud spacing after formation of each stud with the strand clamped therein, and means for unclamping the clamp and moving it longitudinally rearwardly to its original position.

3. Apparatus according to claim 2 in which the means for twisting the line wires together includes a guide rod having parallel longitudinal grooves terminating in converging holes adjacent the point of assembly, and means for rotating said guide rod while the formed end of the strand is prevented from rotating.

4. Apparatus according to claim 3 in which the means for wrapping the stud wires around the line wires includes a first member rotatably surrounding said guide rod, a twister pin extending from said first member adjacent the point of assembly, a second member rotatably surrounding said first member, a twister finger extending from said second member adjacent the point of assembly, said twister pin and twister finger normally being on diametrically opposed sides of the line wires, and means for rotating the first and second member in opposite directions with the completed end of the strand clamped and a stud wire in position between the line wires.

5. Apparatus according to claim 1 in which the means for twisting the line wires together includes a guide rod having parallel longitiudinal grooves terminating in converging holes adjacent the point of assembly, and means for rotating said guide rod while the formed end of the strand is prevented from rotating.

6. Apparatus according to claim 5 in which the means for wrapping the stud wires around the line wires includes a first member rotatably surrounding said guide rod, a twister pin extending from said first member adjacent the point of assembly, a second member rotatably surrounding said first member, a twister finger extending from said second member adjacent the point of assembly, said twister pin and twister finger normally being on diametrically opposed sides of the line wires, and means for rotating the first and second members in opposite directions with the completed end of the strand clamped and a stud wire in position between the line wires.

7. The method of making a strand of line wires with wire studs attached thereto at spaced intervals which comprises feeding the line wires longitudinally and twisting them together to form an eye therein at a point of assembly, feeding a stud wire through the eye at the point of assembly with its ends extending from the line wires, then wrapping the stud wire around the line wires with their ends extending therefrom in the same direction, and then repeating the operations until a strand of the desired length is formed.

8. The method of claim 7 in which the line wires are fed longitudinally a distance equal to the spacing between studs after formation of each stud.

9. The method of claim 7 in which the line wires are twisted together after each stud wire is wrapped around the line wires and while the stud wire is prevented from turning.

10. The method of claim 9 in which the line wires are fed longitudinally a distance equal to the spacing between studs after each twisting of the line wires.

References Cited

UNITED STATES PATENTS

| | | | |
|---|---|---|---|
| 280,189 | 6/1883 | Kittleson | 140—67 |
| 1,583,320 | 5/1926 | Smith | 140—71 |
| 2,254,238 | 9/1941 | Nelson | 140—58 |
| 3,167,280 | 1/1965 | Stokes | 245—1 |

CHARLES W. LANHAM, *Primary Examiner.*